June 26, 1962 W. H. LOCKWOOD ET AL 3,040,386

METHOD OF FABRICATING A LAMINATED MAGNETIC RECORDING SLEEVE

Filed Aug. 29, 1957 2 Sheets-Sheet 1

INVENTORS W. H. LOCKWOOD
H. PETERS

BY George S. Indig

ATTORNEY

METHOD OF FABRICATING A LAMINATED MAGNETIC RECORDING SLEEVE

Filed Aug. 29, 1957 2 Sheets-Sheet 2

INVENTORS W. H. LOCKWOOD
H. PETERS
BY

ATTORNEY

United States Patent Office 3,040,386

Patented June 26, 1962

3,040,386

METHOD OF FABRICATING A LAMINATED MAGNETIC RECORDING SLEEVE

William H. Lockwood, New Providence, and Henry Peters, Summit, N.J., assignors to Bell Telephone Laboratories, Incorporated, New York, N.Y., a corporation of New York Filed Aug. 29, 1957, Ser. No. 681,003
2 Claims. (Cl. 18—59)

This invention relates to processes for producing magnetic recording media, and to the products of such processes.

Magnetic recording systems are well suited for a variety of applications such as weather announcements, service quotations, and various other services where dependable continuous operation and ease of erasure are essential. It has been found that those systems where the recording head is in intimate contact with the recording medium give the best results in this type of service. United States Patent No. 2,734,033 teaches the use of an elastomeric sleeve containing ferromagnetic particles as the recording medium for such systems.

Where the system requires a recording medium in the form of a sleeve which fits over and clings to a cylinder, a sleeve having elastic properties is indicated. However, a particular elastomeric material which can be used to fabricate a sleeve possessing the necessary qualities of high abrasion resistance and low coefficient of friction may be unsuitable because the addition of ferromagnetic particles thereto severely reduces its elasticity. This invention teaches the use of a laminated recording sleeve comprising a thin magnetically active outer layer and an elastomeric magnetically inert base layer, which overcomes this problem. Thus, an elastomeric material with the requisite physical properties described above can be appropriately used for the outer layer of a two-layer laminated sleeve and a second material which meets the requirement of elasticity can be used for the base layer.

The use of a laminated sleeve also makes possible the use of a higher concentration of ferromagnetic particles than that heretofore used in non-laminated elastic sleeves. This increased concentration makes possible a higher signal-to-noise ratio, which is highly desirable. A manifest advantage of such a laminated recording medium is the ease of erasure of recorded sound therefrom, since the thinner the magnetically active medium, the easier such erasure becomes. Ease of erasure is desirable since less complicated circuits can be used with consequent reduction in the size and cost of a recording system.

In essence, the process of this invention comprises first coating the inner surface of a sleeve mold, which has a mirror-smooth finish, with a compound comprising a vulcanizable material, a solvent therefor, and ferromagnetic particles, and evaporating the solvent so as to leave a uniform layer of magnetically active material. A standard transfer or compression molding process is then used to form a base layer of a vulcanizable elastomer in intimate contact with the magnetically active coating. After vulcanization, the finished laminated sleeve comprising two layers is removed from the mold and is ready to use.

The advantageous recording characteristics of a sleeve made by the present invention result in large measure from the mirror-like smooth surface obtained. Such smoothness stems from the fact that the surface was produced in contact with the highly polished inner surface of the mold. Use of a smooth surface reduces mechanical chatter of the recording head and also removes electrical mismatching between the head and the recording medium. A sleeve with a smooth surface therefore is capable of producing a higher qualtity sound reproduction. Moreover, the low coefficient of friction of a sleeve produced by this process minimizes wear on the contacting parts and thereby reduces maintenance and repair costs.

The invention will be better understood from the following more detailed description taken in conjunction with the accompanying drawings in which.

The drawings listed above are drawn not to scale in order to show more clearly the steps of the present process.

With respect now more particularly to the various elements shown in FIGS. 1A through 1E, FIG. 1A shows steel outer ring 1 which is a component part of the well known type of mold used in transfer molding techniques.

Figure 1A:
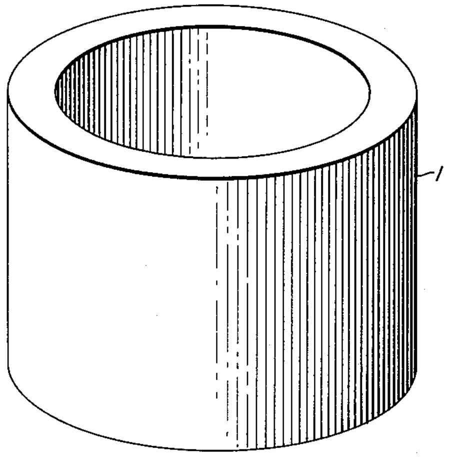
FIG. 1A is a perspective view of the outer ring of a transfer mold used in a process herein.
Figure 1B:
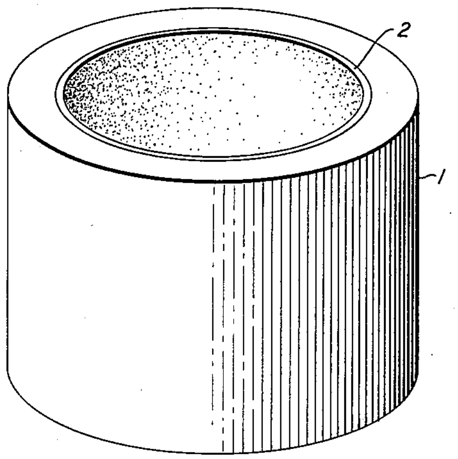
FIG. 1B is a perspective view of the outer ring of FIG. 1A with a coating containing ferromagnetic particles on the inner surface.

FIG. 1B shows steel ring 1 which has a coating 2 on its inner surface. The coating 2 is formed, preferentially, by dipping techniques, utilizing an outer layer mixture comprising ferromagnetic particles, a vulcanizable material, and a solvent, the composition of which is discussed more in detail below. Coating 2 may also be formed by brushing or spraying, but if brushing is used, particular care must be taken to form an even coating over the entire inner surface of ring 1.

Coating 2 is then air dried for approximately 30 minutes to remove the solvent. This drying step may also be practiced at elevated temperatures but care must be taken not to blister the coating by using too high a temperature. Advantageously, coating 2 should be from 2 to 5 mils thick. The minimum thickness, 1 mil, is set by the minimum requirements of magnetically active material. The maximum thickness is limited only by the fact that as the outer layer increases in thickness the sleeve produced by this process becomes less advantageous as compared with a non-laminated sleeve.

Figure 1C:
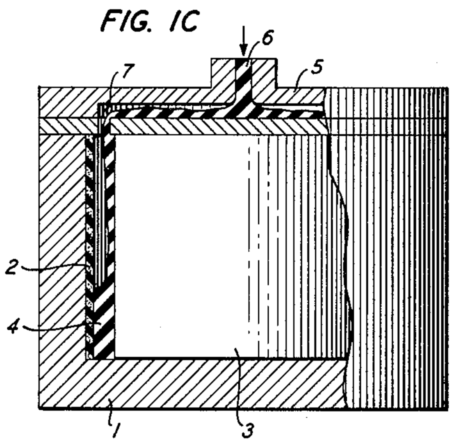
FIG. 1C is a front elevation view, partly in section, of the outer ring as shown in FIG. 1B with a core placed therein and with a head attached thereto for the purpose of forming a laminated sleeve in accordance with transfer molding techniques.

FIG. 1C shows ring 1 containing coating 2 in which has been placed cylindrical steel core 3 leaving annular space 4 between core 3 and coating 2. Also shown is steel head 5 through which the mixture used to form the base layer is introduced. The base layer mixture is placed in a hopper, not shown, which is associated with the transfer molding equipment being used. The mixture is preheated in the hopper, and is then forced under pressure to flow into annular space 4. In particular, the mixture is forced through opening 6, is distributed around the perimeter of head 5 and is introduced into annular space 4 through a series of holes one of which, hole 7, is shown in section. The thickness of the base layer so formed should be in the approximate range of from 1/32" to 3/16", these limits being set by the practicalities of use of the sleeve.

In accordance with well known techniques, the mold and contents are then heated by means of platens, for instance, to a vulcanizing temperature, and maintained at this temperature for a specified period of time.

Figure 1D:
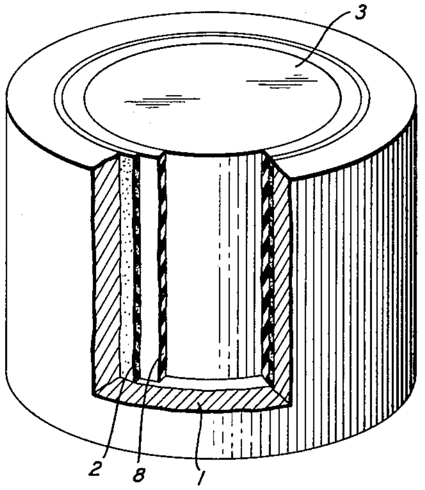
FIG. 1D is a perspective view partly in section of the outer ring of the transfer mold and the laminated sleeve produced.

FIG. 1D shows the transfer mold from which head 5 has been removed after the vulcanizing step. The sectioned portion shows successively outer ring 1, outer layer 2, base layer 8, and core 3.

Figure 1E:
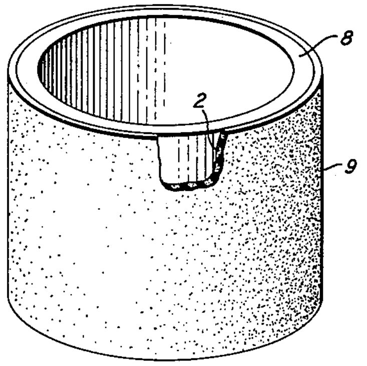
FIG. 1E is a perspective view, partly in section, of the laminated sleeve produced by this process.

FIG. 1E shows the laminated sleeve 9 after removal from the mold, with outer layer 2 partly in section.

With respect now to the various elements shown in FIGS. 2A through 2E, FIG. 2A shows steel outer ring 20 which is a component of the well known type of mold used in compression molding techniques.

Figure 2A:
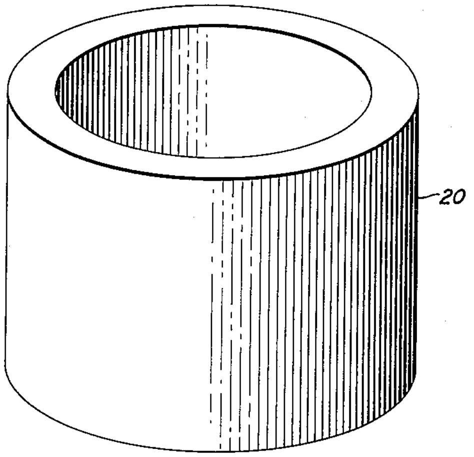
FIG. 2A is a perspective view of an outer ring of a compression mold used in a process herein.
Figure 2B:
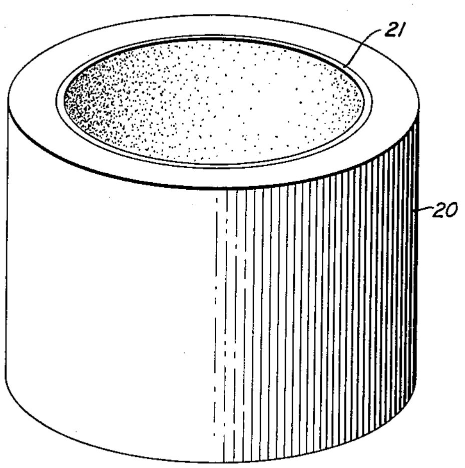
FIG. 2B is a perspective view of the outer ring of FIG. 2A with a coating containing ferromagnetic particles on the inner surface.

FIG. 2B shows ring 20 with a coating 21 on its inner surface. Coating 21 is formed and dried in accordance with the techniques used in the transfer molding process described above. The thickness limitations noted above for sleeves produced by transfer molding are applicable to sleeves produced by compression molding techniques.

Figure 2C:
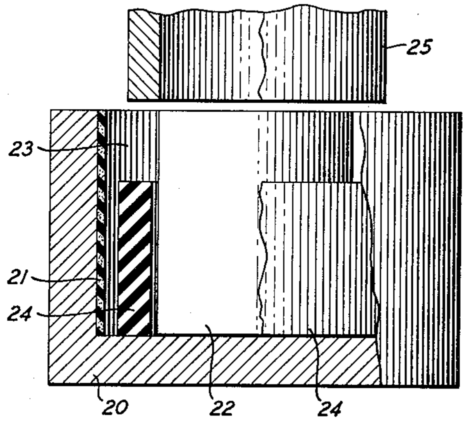
FIG. 2C is a front elevation view, partly in section, of the outer ring as shown in FIG. 2B with a core and molding compound therein, and a second ring positioned above the outer ring for forming a laminated sleeve in accordance with compression molding techniques.

FIG. 2C shows steel ring 20 containing coating 21 into which is inserted cylindrical steel core 22 leaving annular space 23 between coating 21 and core 22. A strip 24 of base layer mixture is then placed in annular space 23 in accordance with compression molding techniques. Steel ring 25, shown positioned above outer ring 20, is then forced downward causing strip 24 to flow and fill the balance of annular space 23 unoccupied by ring 25 thus forming the base layer. The thickness of the base layer can be in the range of from 1/32" to 3/16". In accordance with compression molding techniques, the mold and strip 24 can be preheated prior to molding.

The mold and contents are then heated to a vulcanizing temperature and maintained at that temperature for a time to complete the vulcanization process.

Figure 2D:
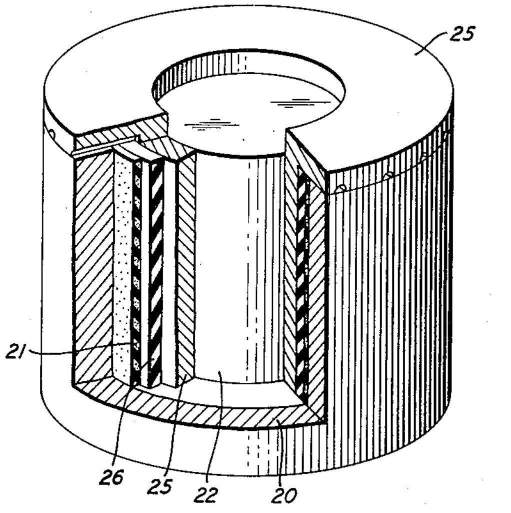
FIG. 2D is a perspective view partly in section of the compression mold and the laminated sleeve produced.

FIG. 2D shows the compression mold after the vulcanizing step. The sectioned portion shows successively outer ring 20, outer layer 21, base layer 26, ring 25, and steel core 22.

Figure 2E:
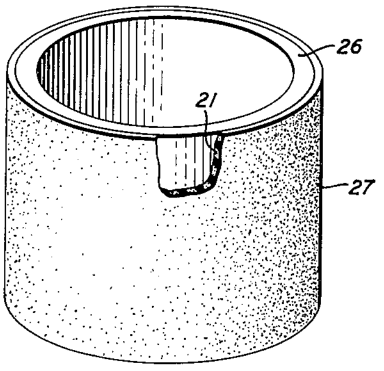
FIG. 2E is a perspective view partly in section of the laminated sleeve produced by the steps shown in FIGS. 2A through 2C.

FIG. 2E shows laminated sleeve 27, produced by the practice of this embodiment, in which outer layer 21 is shown partly in section.

The success of the present process is dependent in large measure on the choice of materials used to form the layers of the laminated sleeve. The coating produced from the outer layer mixture in accordance with the present process must be capable of being vulcanized. Furthermore, the base layer mixture should also be vulcanizable. Since the use to which these sleeves are to be put requires that the sleeves adhere by elastic tension an additional requirement placed upon the material which forms the base layer is that after vulcanization it have the properties of elasticity and resiliency.

An outer layer mixture which has been found to produce a sleeve with a low coefficient of friction and high abrasion resistance is shown in Table I.

TABLE 1

| Ingredient | Preferred Composition Parts by Weight | Range of Composition Parts by Weight |
|---|---|---|
| Chlorosulfonated Polyethylene | 88 | 88 |
| Magnesium Oxide | 20 | 15–30 |
| Hydrogenated Rosin | 2.5 | 1–3 |
| Dipentamethylenethiuram Tetrasulfide | 1.0 | 1–3 |
| Magnetic Iron Oxide | 300 | 100–350 |
| Toluene | 1,250 | 450–1900 |

Lead oxide and lead salts such as tribasic lead maleate may be substituted for the magnesium oxide. Also, other accelerators used in rubber compounding such as mercaptobenzothiazole diphenylguanidine, and benzothiazyl disulfide may be substituted for dipentamethylenethiuram tetrasulfide.

Another outer layer mixture suitable for producing a laminated sleeve with a low coefficient of friction and high abrasion resistance is shown in Table II.

TABLE II

| Ingredient | Preferred Composition Parts by Weight | Range of Composition Parts by Weight |
|---|---|---|
| Urethane Rubber | 100 | 100 |
| Magnetic Iron Oxide | 150 | 100–350 |
| Benzothiazyl Disulfide | 3 | 2–4 |
| Mercaptobenzothiazole | 1 | 0.5–1.5 |
| Sulphur | 2.5 | 2–3 |
| Benzothiazyl Disulfide+Zinc Chloride (mol ratio 1:1) | 1.5 | 1–2 |
| Methyl Ethyl Ketone | 750 | 400–1,800 |

Accelerators used in rubber compounding such as dipentamethylenethiuram tetrasulfide and diphenylguanidine may be substituted for benzothiazyl disulfide or mercaptobenzothiazole.

A base layer mixture which is suitable for use in the present invention is shown in Table III.

TABLE III

| Ingredient: | Parts by weight |
|---|---|
| Butadiene acrylonitrile rubber | 100 |
| Benzothiazyl disulfide | 1.5 |
| Sulphur | 1.5 |
| Stearic acid | 1.5 |
| Zinc oxide | 5 |
| Liquid butadiene acrylonitrile | 20 |
| Carbon black | 30 |

A mixture comprising any vulcanizable elastomer, such as natural rubber, neoprene, butyl rubber, GR–S, or Hypalon, may be used to form the base layer of a laminated sleeve made by the practice of this process.

Two examples of this invention are fully described below, one utilizing the transfer molding techniques as illustrated in FIGS. 1A through 1E, and the other utilizing the compression molding process as shown in FIGS. 2A through 2E.

*Example 1*

The outer ring 1 was coated with the preferred composition shown in Table I by dipping techniques to form coating 2. The coating, 3 mils thick, was then air dried for approximately 30 minutes to eliminate the toluene. The transfer mold including head 5, outer ring 1 containing coating 2, and core 3 was then assembled.

Base layer mixture of composition as shown in Table III was then placed in the hopper associated with the transfer molding equipment being used and preheated to 200° F. The mixture was then forced under pressure into annular space 4, filling this space and forming a base layer 1/8" thick in intimate contact with coating 2.

The mold was then heated to 310° F., using steam-heated platens, and maintained at this temperature for 45 minutes to vulcanize the sleeve. The mold was then cooled and the finished sleeve 9 was removed.

*Example 2*

The outer ring 20 was coated with the preferred composition shown in Table II by dipping techniques to form coating 21. The coating, 3 mils thick, was then air dried for approximately 30 minutes to eliminate the methyl ethyl ketone. The compression mold including outer ring 20 containing coating 21, and core 22, was then assembled. A strip 24 of composition as shown in Table III was placed into annular space 23, the volume of strip 24 being approximately equal to the volume of the base layer desired as is customary in compression molding techniques. The mold containing strip 24 was then preheated to approximately 150° F. by means of steam-heated platens. Ring 25 was then positioned over the compression mold and forced downward into the mold under pressure in accordance with well known compression molding techniques. Strip 24 was thereby forced to flow into that part of annular space 23 not taken up by ring 25 and formed a base layer ⅛" thick.

The mold was then heated to 310° F. and maintained at this temperature for a period of 45 minutes to vulcanize the laminated sleeve formed. The mold was then cooled and finished sleeve 27 removed.

The vulcanization step in both examples consisted of maintaining the sleeve and mold at a temperature of 310° F. for a period of 45 minutes. Any temperature in the range of 275° F. to 320° F. for a time of from 30 minutes to 60 minutes can conveniently be substituted for the specified preferred time and temperature.

When utilized in compression molding techniques the mixture shown in Table III can be preheated to any temperature from room temperature to 200° F. prior to molding, and when utilized in a transfer molding process can be preheated in the hopper to any temperature in the range of 150° F. to 350° F.

It is to be understood that the particular formulations listed above for the mixtures to be used for the base and outer layers are for illustrative purposes only and the process is not restricted to the use of these particular formulations. A worker skilled in the art may use any formulations which can be readily developed in the practice for the present process. Furthermore, the two specific examples described are merely illustrative of the principles of this invention, as are the processes of compression and transfer molding described. Any molding process wherein an outer layer of a laminated sleeve is formed by coating a smooth mold surface is considered within the spirit and scope of this process.

What is claimed is:

1. The method of fabricating a laminated magnetic recording sleeve comprising the steps of forming on a mirror-smooth inner surface of a hollow cylinder, a coating of uniform thickness comprising 88 parts by weight of chlorosulfonated polyethylene, 15–30 parts by weight of magnesium oxide, 1–3 parts by weight of hydrogenated rosin, 1–3 parts by weight of dipentamethylenethiuram tetrasulfide, 100–350 parts by weight of magnetic iron oxide and 450–1900 parts by weight of toluene, drying said coating to remove the toluene therefrom, molding a material comprising a vulcanizable elastomer into a layer of uniform thickness in intimate contact and coextensive with the inner surface of the dried coating, heating said layer and dried coating to a temperature within the range of 275–325° F., and maintaining said layer and said dried coating at said temperature for a period of time within the range of 30–60 minutes, thereby vulcanizing said layer and said dried coating.

2. The method of fabricating a laminated magnetic recording sleeve comprising the steps of forming on a mirror-smooth cylinder, a coating of uniform thickness comprising 100 parts by weight urethane rubber, 100–350 parts by weight magnetic iron oxide, 3–4 parts by weight benzothiazyl disulfide, 0.5–1.5 parts by weight mercaptobenzothiazole, 2–3 parts by weight sulphur, 1–2 parts by weight benzothiazyl disulfide + zinc chloride (mol ratio 1:1), and 400–1800 parts by weight methyl ethyl ketone, drying said coating to remove the methyl ethyl ketone therefrom, molding a material comprising a vulcanizable elastomer into a layer of uniform thickness in intimate contact and coextensive with the inner surface of the dried coating, heating said layer and dried coating to a temperature within the range of 275 to 325° F., and maintaining said layer and said dried coating at said temperature for a period of time within the range of 30–60 minutes, thereby vulcanizing said layer and said dried coating.

References Cited in the file of this patent

UNITED STATES PATENTS

| | | |
|---|---|---|
| 871,554 | Aylsworth | Nov. 19, 1907 |
| 2,409,486 | Hagen et al. | Oct. 15, 1946 |
| 2,464,060 | Rowe et al. | Mar. 8, 1949 |
| 2,572,879 | Morris et al. | Oct. 30, 1951 |
| 2,734,033 | Menard | Feb. 7, 1956 |
| 2,739,919 | Artzt | Mar. 27, 1956 |
| 2,745,778 | Garten | May 15, 1956 |
| 2,765,248 | Beech et al. | Oct. 2, 1956 |
| 2,799,609 | Dalton | July 16, 1957 |
| 2,862,845 | Szegvari | Dec. 2, 1958 |

FOREIGN PATENTS

| | | |
|---|---|---|
| 515,675 | Great Britain | Mar. 3, 1938 |
| 1,004,046 | France | Nov. 21, 1951 |